Figure 1:
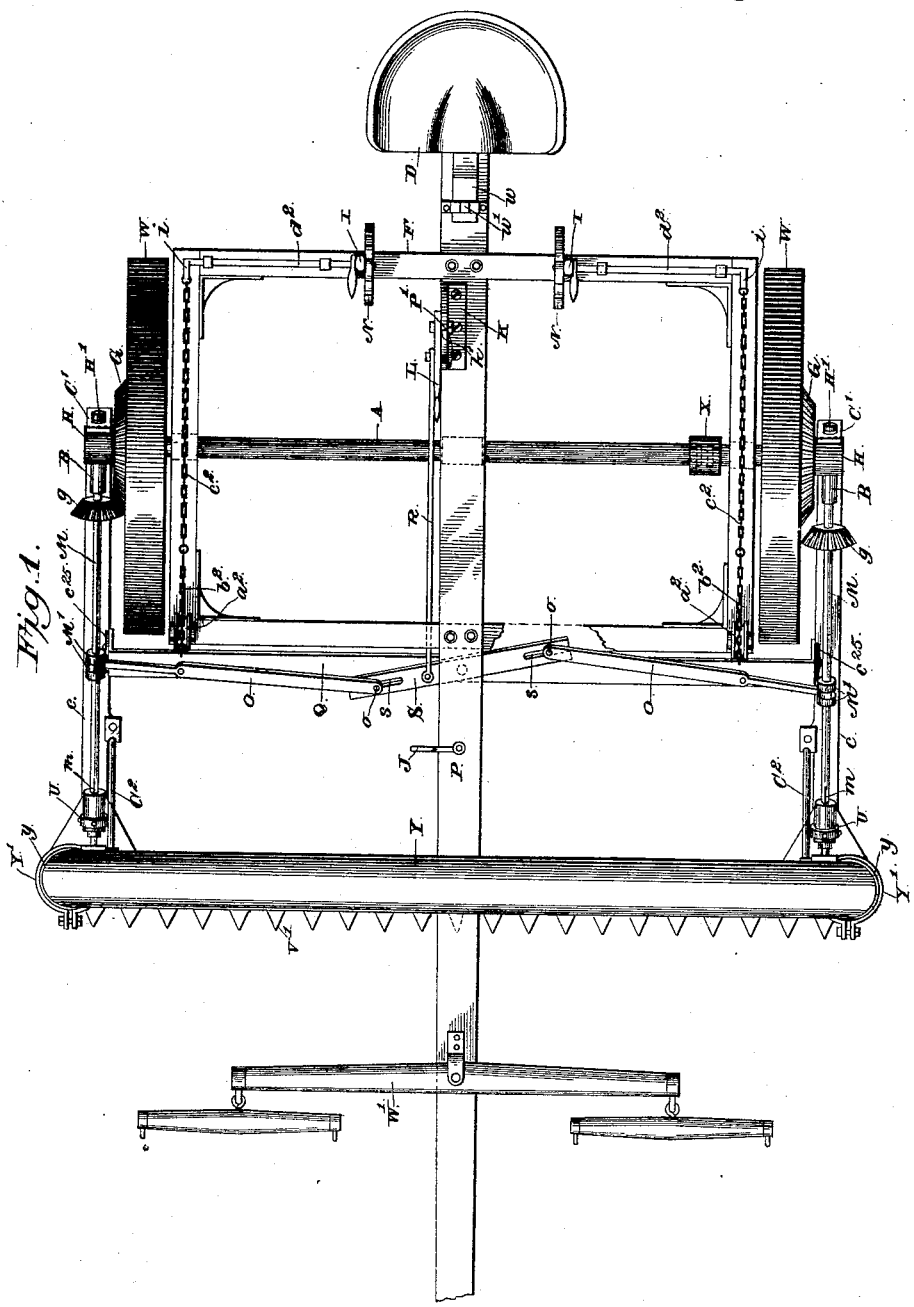

(No Model.)  3 Sheets—Sheet 1.

A. D. MARBLE.
MOWER AND HEADER.

No. 480,730. Patented Aug. 16, 1892.

Witnesses
M. Fowler
N. T. Collamer

Inventor
Albert D. Marble
By his Attorneys,
C. A. Snow & Co.

(No Model.)  3 Sheets—Sheet 2.
A. D. MARBLE.
MOWER AND HEADER.
No. 480,730. Patented Aug. 16, 1892.
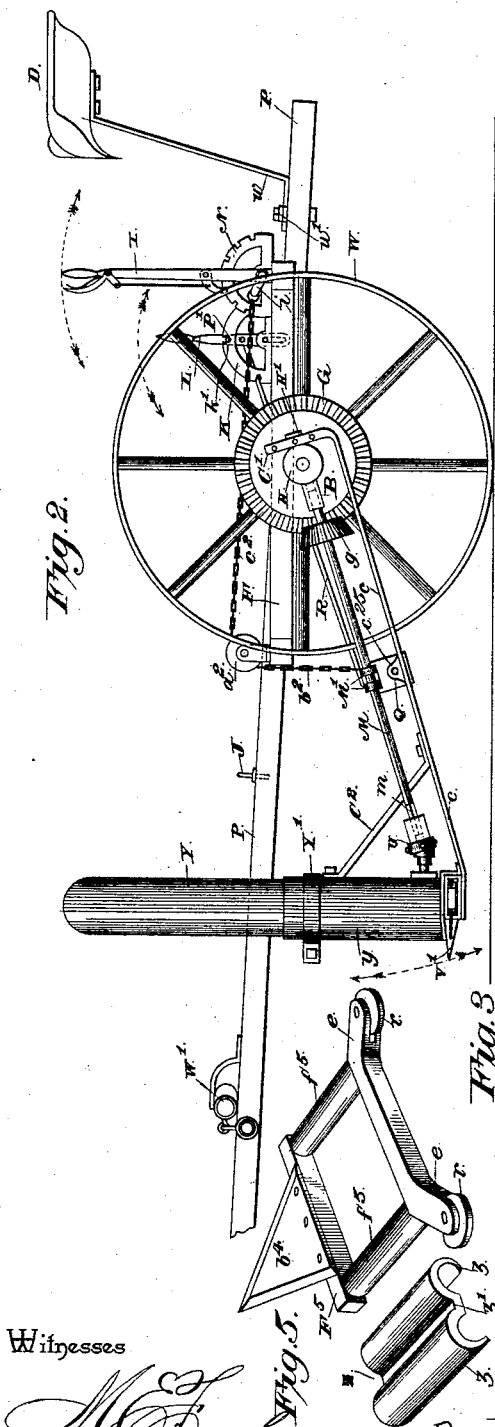
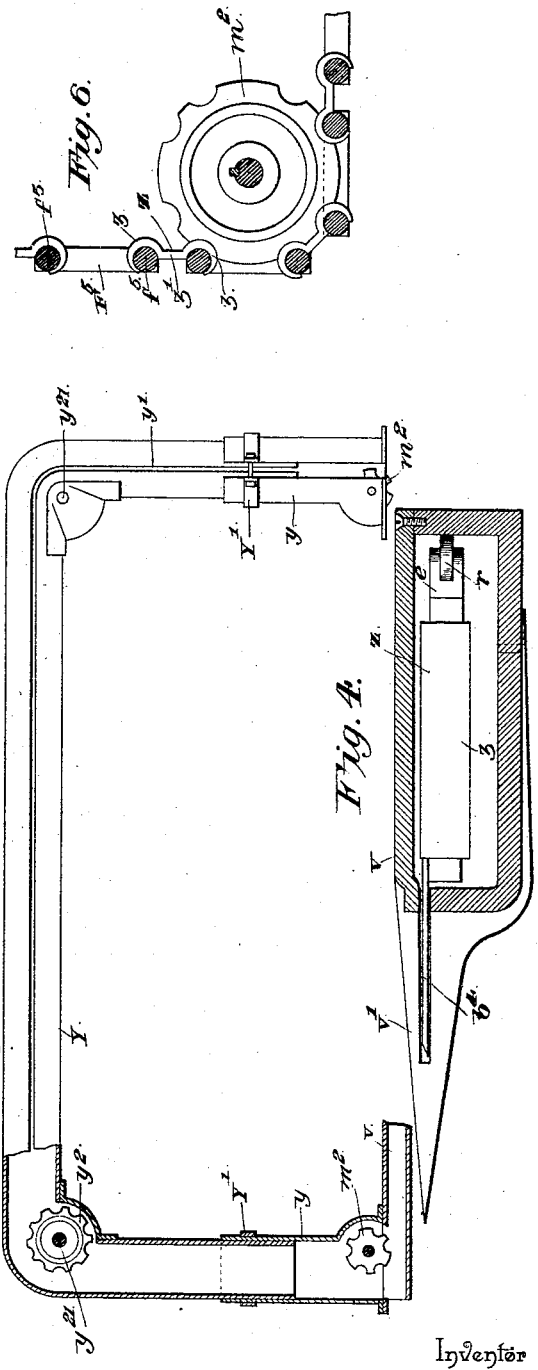
Witnesses
M. Fowler
N. L. Collamer
Inventor
Albert D. Marble
By his Attorneys,
C. A. Snow & Co.

(No Model.) 3 Sheets—Sheet 3.
A. D. MARBLE.
MOWER AND HEADER.
No. 480,730. Patented Aug. 16, 1892.
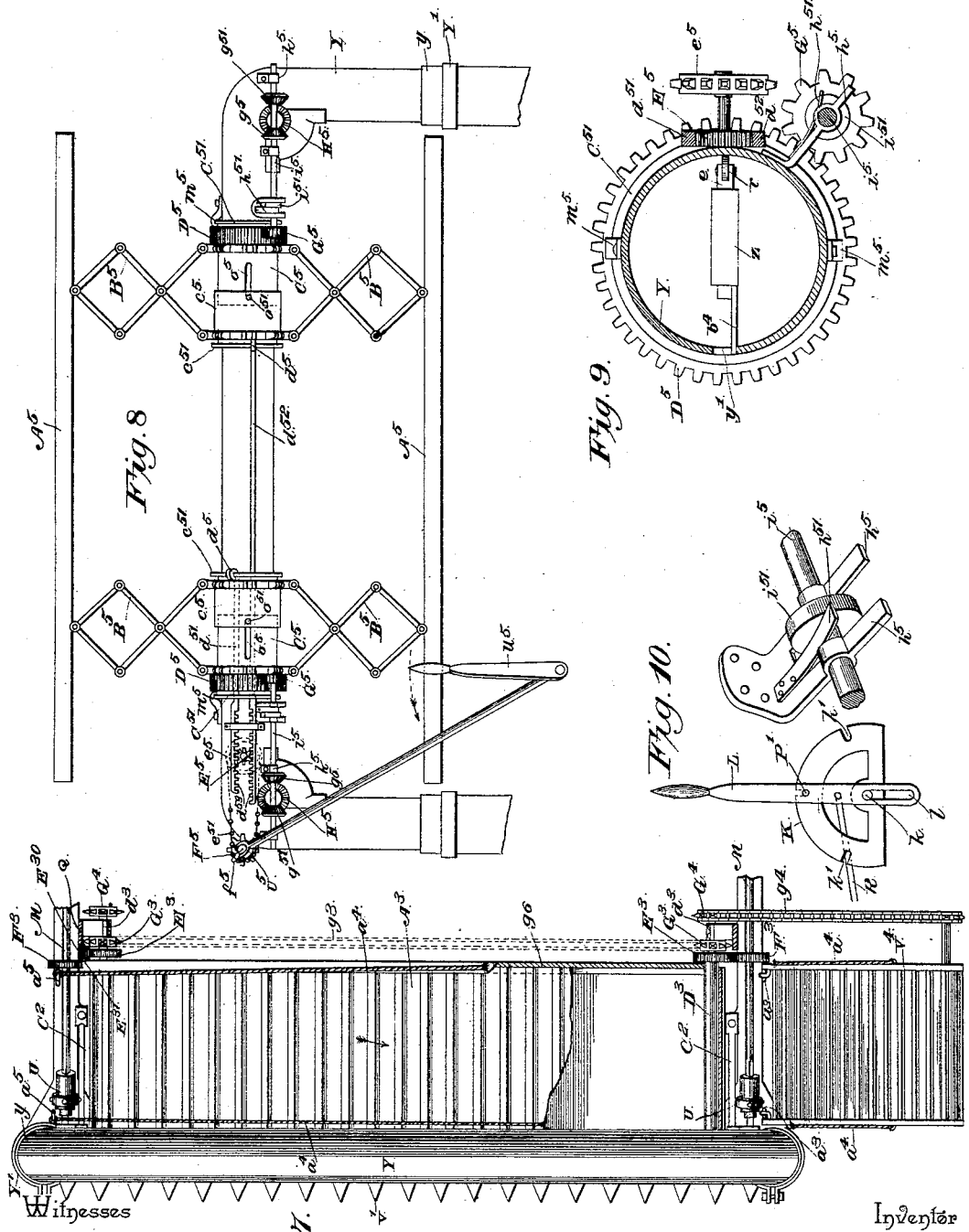
Witnesses
M. Fowler
N. J. Collamer
Inventor
Albert D. Marble
By his Attorneys,
C. A. Snow & Co.

UNITED STATES PATENT OFFICE.

ALBERT D. MARBLE, OF WINFIELD, KANSAS.

MOWER AND HEADER.

SPECIFICATION forming part of Letters Patent No. 480,730, dated August 16, 1892.

Application filed April 30, 1891. Serial No. 391,117. (No model.)

*To all whom it may concern:*

Be it known that I, ALBERT D. MARBLE, a citizen of the United States, residing at Winfield, in the county of Cowley and State of Kansas, have invented a new and useful Mower and Header, of which the following is a specification.

This invention relates to harvesters, and more especially of that class adapted for the mowing or heading of grass or grain; and the object of the same is to effect certain improvements in machines of this character.

To this end the invention consists of the details of construction hereinafter more fully described and claimed, and as illustrated on the three sheets of drawings, wherein—

Figure 1 is a plan view of the machine when used as a mowing-machine. Fig. 2 is a side elevation thereof. Fig. 3 is a front elevation of the knife-frame partly in section. Fig. 4 is an enlarged transverse section of the cutting apparatus. Fig. 5 is a perspective detail of one of the knives and one connecting-link. Fig. 6 is a detail showing one of the driving sprocket-wheels and a section of the knife-chain passing around the same. Fig. 7 is a plan view of the cutting apparatus, with the header-belt and elevator attached. Fig. 8 is a rear elevation, and Fig. 9 a cross-section, of the upper side of the cutting apparatus with the reel attached. Fig. 10 shows certain details in perspective.

Referring to the said drawings, the letter F designates a frame supported upon a two-part main axle A, to which are keyed driving-wheels W, the meeting ends of said part having a box X, as is usual, to permit the independent turning of the wheels in rounding corners. A pole P is secured to the frame and connected to the center of the axle, and rising from the rear end of the pole is a driver's seat D, as shown. The foot $w$ of this seat is adjustably seated beneath a strap $w'$ in order that the seat may be moved forward or backward to balance the weight of the machine by adjusting the position of the driver slightly. Secured to the pole just in front of the frame F is the usual whiffletree W', carrying single-trees at its ends, to which the horses are attached, and it will be understood that these horses travel at each side of the pole and in front of the frame F. Each wheel carries a large bevel-gear G on its outer face, with which meshes a small bevel-gear $g$ on the end of main driving-shaft M.

On the outer ends of the axle A are mounted hubs H, from which extend forwardly tubular boxes B, in which the upper rear ends of said driving-shafts M are loosely journaled, and the front lower ends of these shafts M are squared, as at $m$, where they enter the rearmost members of universal joints U. By this means when one of the said shafts M is moved forwardly its gear $g$ disengages the gear G and its rotation ceases, and the square end $m$ of the shaft sliding in a similarly-shaped hole in the rear member of the universal joint U permits this longitudinal movement. The means for effecting such movement will now be described. K is a bracket mounted on the rear end of the pole P just in front of the seat D and having a pin $k$ at its base and notches $k'$ in its semicircular periphery, (see Fig. 10,) and L is a lever having a slot $l$ in its body loosely engaging said pin. P' is a stud passing through this lever at a proper point to engage said notches when the lever is raised and lowered by sliding its slot $l$ over the pin $k$. R is a pitman-rod connecting with this lever, and the forward end of this rod is connected with a shifter-bar S, which is centrally pivoted on a support Q, extending across the machine forward of the wheels W. The ends of the shifter-bar S are slotted at $s$, and the slots engage pins $o$ at the inner ends of operating-levers O. The latter are pivoted also to the support Q, and their outer ends are bifurcated and loosely embrace the shafts M between fixed collars M' thereon. Hence when the lever L is thrown to the front, as shown in Fig. 1, the right-hand lever O is so moved as to engage the right-hand gears G and $g$ and disengaging those at the left of the machine, and it will be understood that when the lever L is thrown rearwardly the opposite will be the result and the left-hand shaft M will be turned in the opposite direction; but when the lever L is upright, as shown in Fig. 2, with its stud P' seated in the central notch $k$ for security and to prevent dislocation, both shafts M will be at rest. It will therefore be seen that the driver can throw the machine out of operation or cause the shafts to operate in opposite directions at will.

The cutting apparatus, hereinafter described, is supported on a frame c, which has ears $c^{25}$, pivotally connected to the ends of the support Q, and the rear ends of the side-bars of the frame are turned up, as at C', and may be detachably connected by pins or bolts with rearward extensions H' of the hubs. In this manner the angle of the cutting apparatus to the ground can be adjusted.

N N are semicircular standards rising from the frame F at each side of and within reach of the driver from his seat, and I I are levers pivoted in said standards and having the usual retaining-pawls, as shown. The lower end of each lever is keyed on a shaft $d^2$, which extends outwardly over the frame and has a crank $i$ at its outer end. From this crank a chain or rod $c^2$ leads forwardly and connects with a chain $b^2$, which passes over a wheel $a^2$, mounted on the front corner of the frame, the lower end of this chain being attached to the support Q. By this means when an obstruction is reached the driver may raise the cutting apparatus, so as to pass it over the same—that is to say, the lever I when drawn upon raises the support Q at the end thereof, and that end of the cutting apparatus is lifted from the ground. Both ends of the cutting apparatus can of course be raised simultaneously, and by engaging the pawls of the levers I in the standards N the cutting apparatus can be maintained in elevated position.

J is a hook pivoted to the pole P about where shown, and when the machine is to be moved for a considerable distance without cutting the cutting apparatus may be held elevated by this hook.

The letter V designates the cutter-bar, which includes the finger-bar, and Y is a knife-frame rising from said cutting apparatus, as seen in Fig. 3. These parts are of the following construction: The cutter-bar is a rectangular tube, Fig. 4, from whose front side projects the fingers V', and from the ends of this tube rise other tubes $y$, into which the vertical members of the frame Y telescope, as seen in Fig. 3, clips Y' holding the parts adjusted. The frame thus made is supported in approximately vertical position from the front ends of the side bars C of the supporting-frame, hereinafter mentioned, and diagonal braces $C^2$ connect the parts to keep them in place. The front side of the frame Y is provided with a slot $y'$ for examining the knives. Within the frame above mentioned and within the tubular cutter-bar moves an endless chain of knives, and wheels $y^2$ at the upper corners of the frame and driving-wheels $m^2$ at the lower corners thereof carry this chain, the wheels $m^2$ being connected to the front members of the universal joints U, as will be clear. By the adjustment of the telescoping members of the frame this chain is kept taut and all wear is taken up. Each knife of the chain is constructed as best seen in Fig. 5. The blades $b^4$ are bolted to a rectangular frame $F^5$, whose side bars $f^5$ are rounded. The rear bar of this frame is bent rearwardly at its ends $e$ and bifurcated, and in the bifurcations are journaled rollers $r$, which bear against the back of the cutter-bar V and the frame Y. Z are links, each of which comprises two hook-shaped portions $z$, connected by an interposed web $z'$, the hooks being of proper size to embrace the rounded side bars $f^5$ of the frame $F^5$. Referring now to Fig. 6, the endless chain of knives and links is passed around the four wheels in the frame Y and at the end of the cutter-bar V, the frames and the links moving within the tubular bar and yoke and the blades projecting through the slots therein, the open sides of the hooks $z$ being outermost and the tension of the chain preventing the dislocation of the members.

The above-described device is closely allied to that shown and described by me in an application for Letters Patent, Serial No. 379,426, filed by me on or about the 28th of January, 1891, and I lay no claim herein to the features thereof which are covered by the claims in that application.

The second part of the present invention consists of the means and mechanism for attaching a carrier-belt and elevator to this improved form of cutter, and I will now proceed to describe the same. Referring to Fig. 7, the letter $A^3$ designates an endless apron passing over rollers $D^3$ and standing just in rear of the cutting apparatus. The front ends of these rollers are journaled in the said cutting apparatus, and their rear ends pass through bearings $d^3$ on the support Q and carry sprocket-wheels $G^3$, which are connected by a chain $g^3$, although this may be omitted, as the apron $A^3$ will usually drive the rollers in unison. One (and sometimes both) of the rollers carries another sprocket-wheel $G^4$, from which a chain-belt $g^4$ leads upwardly to the elevator $V^4$. The latter may be of any approved construction similar to that shown or otherwise without departing from the spirit of my invention, and its lower end has hooks supported in eyes $a^3$ in the frame C, while its upper end is supported by guy ropes or wires $a^4$, leading from similar eyes $a^5$ at the other side. When the elevator is attached to the other side of the device, the location of these parts is reversed, as will be clear. $E^3$ is a gear on one of the rollers $D^3$, which intermeshes with a gear $F^3$ on one of the main shafts M, and by this means motion is imparted to the apron $A^3$. The edges of the apron preferably travel in guides $g^6$ in a suitable framework for the purpose of steadying it in its motion. With this apron in place and moving in the direction of the arrow, the grain as it is cut falls thereupon by the aid of the reel, hereinafter described, and is passed to the elevator, whereby it is raised and thrown off at the side of the machine; or, if desired, any suitable binding mechanism may be mounted at the upper end of the elevator for delivering the grain in bundles. At the other side of the machine—that is to say, opposite the elevator—the gears $E^3$ and $F^3$ intermesh with an idle-pinion $E^{30}$, mounted on a stub-shaft $E^{31}$, the object being to cause this gear $E^3$ to travel in the same direction as the gear $E^3$ at the other end of the apron $A^3$ even when it is driven by the gear $F^3$ on the other main shaft, which latter, it will be remembered, travels in a direction opposite to the one shown in this figure as now driving the apron. It will be understood that when the elevator is to be connected to the frame at the other end of the apron, and the latter must therefore travel in the opposite direction, this idle-pinion must be transferred to the other side of the machine, which will necessitate a slight change in the construction of the device; but as the manufacturer usually turns out all his harvesters delivering at one side it is rarely that this change will be necessary. Of course when the lever L is moved to throw the other main shaft into connection with the axle, and hence to drive the knives in the opposite direction through the cutter-bar, the gear $F^3$, here shown in engagement with the gear $E^3$, will be moved downwardly, so as to disengage it, and the other gear $F^3$ will be drawn upwardly into engagement with the idle-pinion $E^{30}$. The continued forward movement of the machine and the rotation of the other main shaft M will thus continue to drive the apron and the elevator in the direction indicated.

The third part of the present invention consists of an improved reel preferably used in conjunction with the rotary cutting apparatus described above and not claimed in the companion application hereinbefore referred to, and for an illustration of this reel reference is made to Figs. 8, 9, and 10 of the drawings accompanying. This reel, it will be understood, may be used in connection with the apron above described, or without, as preferred; but when an apron is used I prefer that shown and described for the reason that it is more especially applicable to the rotary cutting apparatus embodied in my machine. $A^5$ are the reel-bars proper, which are connected by toggle-levers $B^5$ with inner collars $C^5$ and outer collars $c^5$, sliding on the inner. The latter have flanges $C^{51}$, engaged by tongues $m^5$, carried by the yoke Y, around which the collars turn. Said collars also have gears $D^5$, intermeshing with gears $G^5$, whose shafts $i^5$ are mounted in bearings $k^5$, carried by the yoke, and which shafts also have oppositely-beveled gears $g^5$ and $g^{51}$, alternately meshing with bevel-gears $H^5$, which are mounted on the shafts $y^{21}$ of the sprocket-wheels $y^2$ in the upper corners of the yoke Y. By this means the motion of the cutting apparatus is communicated to the reel, as will be clear. Upon the shafts $i^5$ are secured collars $i^{51}$, Fig. 10, which are loosely embraced by bearings $h^5$, that have spring-tongues $h^{51}$, and by raising these tongues from one side of the collars and then sliding the shafts $i^5$ the gears $g^5$ may be disengaged from and the gears $g^{51}$ with the gears $H^5$. By this construction the same direction of rotation of the reel is maintained, although the direction of movement of the rotary cutting apparatus may be changed, as will often be found desirable. The above arrangement is the same for each of the inner collars $C^5$. Each is provided with a slot $o^5$, engaged by a pin $o^{51}$ in its outer surrounding collar $c^5$ to cause the pair of collars to rotate in unison.

It is often desirable that the reel-bars $A^5$ shall be adjusted so as to travel in a larger or smaller cylindrical path, and the mechanism for effecting this adjustment is as follows: The outer collars $c^5$ have flanges $c^{51}$, which turn loosely in tongues $d^5$ at the ends of rods $d^{51}$ and $d^{52}$. The former passes over and the latter under a gear $E^5$, and the inner faces of these rods are toothed, as seen at $d^{53}$, to engage said gear. To the latter is connected a sprocket-wheel $e^5$, from which a chain $e^{51}$ leads to another sprocket-wheel $f^5$, mounted on a shaft $F^5$, and the latter (passing through a universal joint $U^5$) extends back to within reach of the operator and has a handle $u^5$ at its rear end. By this means a turning of the handle $u^5$ in one direction causes the gear $E^5$ to turn also and moves the rods $d^{51}$ and $d^{52}$ in opposite directions. This moves the outer collars $c^5$ upon the inner and adjusts the toggle-levers $B^5$. Turning the handle $u^5$ in the opposite direction of course oppositely adjusts the toggle-levers, and any movement of the latter adjusts the reel-bars radially, as will be clear. The horses being started and the wheels W moving forward, motion is imparted to the gears G. The driver throwing one of the gears $g$ into mesh with its gear G, as shown at the right-hand side of the machine illustrated in Fig. 1, motion is communicated to the main shaft M, to its sprocket-wheel $m^2$, and thence to the endless chain of the knives and links. The latter pass transversely across the cutter-bar V, up one side of the frame Y, across the top, and down the other side thereof, the tips of the knives passing through the fingers V' in the finger-bar. To change the direction of the motion of this endless chain of knives, the lever L is moved in the manner above described. When it is desired to stop the motion of the knives entirely, the lever L is raised to a vertical position, as seen in Fig. 2. The angle of the knives to the ground is adjusted by changing the connection of the turned-up rear ends C' of the side-bars C with the hub extensions H', and either or both ends of the support Q, and hence the entire cutting apparatus can be elevated at will by the operator simply by adjusting the levers $i$ under the standards N. The header-belt and elevator can be attached whenever desired by the means described above, and when in position the gear $E^3$ will drive them both. As above described, there is one of these gears upon each main shaft M, so that when the knives become dull and the direction of the motion of the cutting apparatus is changed the direction of motion of the apron will not change with it. The reel attachment operates in an obvious manner, and when the direction of motion of the cutting apparatus changes the shafts $i^5$ are moved, so that the reel still moves in the proper direction. The throw of the reel (that is, the length of the toggle-levers $B^5$) can be adjusted by turning the handle $u^5$, as above described.

This machine is very simple in construction, and the driver occupies an elevated position, where he can not only view the field and guide the horses, but where he is in a position accessible to all the levers and far remote from the dangerous knives. Should he fall from his seat through accident, injury, or sunstroke, casualties so prevalent on the harvest field, he is not only out of danger from the machine itself, but he is not liable to be trampled upon or be kicked by the horses.

The various other advantages arising from the details of construction will be apparent upon a practical use of the machine, and need not be elaborated upon here.

I do not limit myself to the precise arrangement of parts shown and described, as various changes may be made therein without departing from the spirit of my invention.

I claim as the salient features of my invention—

1. In a mowing-machine, the combination, with the oppositely-rotating main shafts M, means for moving said shafts longitudinally, and the gears $F^3$ on the shafts, of the rollers $D^3$, having gears $E^3$, adapted to be engaged alternately by those on the main shafts, and an endless apron passing around said rollers, as and for the purpose set forth.

2. In a mowing-machine, the combination, with a yoke, inner collars thereon, means for turning said collars by the movement of the cutting apparatus, outer collars sliding on said inner collars and turning therewith, and means for adjusting the outer collars longitudinally, of toggle-levers whose feet are connected to the different collars and reel-bars carried by the outer ends of the toggle-levers, as and for the purpose set forth.

3. In a mowing-machine, the combination, with an endless cutting apparatus moving in a yoke over wheels in its corners, a bevel-gear $H^5$ on the shaft of one of said wheels, a bevel-gear intermeshing therewith, and a collar $C^5$, surrounding one side of the yoke and rotated by said intermeshing bevel-gear, of a reel connected with said collar, as and for the purpose set forth.

4. In a mowing-machine, the combination, with an endless cutting apparatus moving in a yoke, means for driving it in either direction through said yoke, a bevel-gear driven by said apparatus, a longitudinally-movable shaft $i^5$, having smaller gears alternately engaging said bevel-gear, and a gear $G^5$ on said shaft, of a gear $D^5$, intermeshing with said gear $G^5$, a collar $C^5$, connected to said gear $D^5$ and surrounding one side of the yoke, and a reel carried by said collar, as and for the purpose set forth.

5. In a mowing-machine, the combination, with an endless cutting apparatus, a large bevel-gear driven thereby, a shaft $i^5$, having smaller gears alternately engaging said larger gear, a collar $i^{51}$ on said shaft, a bearing $h^5$, embracing said collar, a spring-tongue $h^{51}$ therein, and a gear $G^5$ on said shaft, of a gear $D^5$, intermeshing with said gear $G^5$, a collar $C^5$, connected thereto, and a reel carried by said collars, as and for the purpose set forth.

6. In a mowing-machine, the combination, with a cutting apparatus, an inner collar $C^5$, driven thereby and having a slot, an outer collar $c^5$, sliding on the inner collar and having a pin engaging the slot therein, and means for adjusting the outer collar longitudinally, of a toggle-lever connected to the collars and a reel-bar carried by the outer end of the toggle-lever, as and for the purpose set forth.

7. In a mowing-machine, the combination, with a rotating inner collar, an outer collar sliding thereon and turning therewith, a toggle-lever connected to said collars, and a reel-bar carried by said toggle-lever, of a flange $c^{51}$ on the sliding collar, a tongue $d^5$, loosely embracing said flange, a rod leading from said tongue and having teeth, a gear $E^5$, engaging said teeth and connected to a sprocket-wheel $e^5$, a chain leading therefrom to another sprocket $f^5$, mounted on a shaft $F^5$, leading to the operator, and having a handle $u^5$, a universal joint $U^5$ in said shaft, and means for raising and lowering the collars bodily, as and for the purpose set forth.

8. In a mowing-machine, the combination, with the yoke Y, two inner collars $C^5$, turning thereon, outer collars $c^5$ on said inner collar, toggle-levers extending outwardly from the pairs of collars, and reel-bars connected to the toggle-levers, of flanges $c^{51}$ on the outer collars, tongues $d^5$, loosely embracing said flanges and mounted on independent rods $d^{51}$ and $d^{52}$, each of which is toothed, as at $d^{53}$, a single gear $E^5$ between these teeth and simultaneously engaging both, and means for turning said gear from the driver's seat, as and for the purpose hereinbefore set forth.

In testimony that I claim the foregoing as my own I have hereto affixed my signature in presence of two witnesses.

ALBERT D. MARBLE.

Witnesses:
C. T. ATKINSON,
JACOB A. KREAMER.